United States Patent [19]

Myers et al.

[11] Patent Number: 5,260,117
[45] Date of Patent: Nov. 9, 1993

[54] HONEYCOMB OF FABRIC-REINFORCED POLYIMIDE POLYMER

[75] Inventors: Warren D. Myers, Walnut Creek; Ernest M. Bishop, Livermore, both of Calif.

[73] Assignee: Hexcel Corporation, Dublin, Calif.

[21] Appl. No.: 667,909

[22] Filed: Mar. 12, 1991

Related U.S. Application Data

[63] Continuation-in-part of Ser. No. 404,240, Sep. 7, 1989, abandoned.

[51] Int. Cl.$^5$ .................... B32B 3/12; B32B 27/14; B25B 7/00; C08L 77/06
[52] U.S. Cl. .................... 428/196; 428/116; 428/198; 428/245; 428/246; 428/473.5; 428/542.8; 428/902; 525/436; 525/439
[58] Field of Search ............... 428/116, 118, 246, 198, 428/196, 245, 473.5, 902; 525/436, 439; 156/197, 307.1

[56] References Cited

U.S. PATENT DOCUMENTS

| | | |
|---|---|---|
| 1,917,456 | 7/1933 | Mickelson . |
| 2,477,852 | 8/1949 | Bacon .................. 154/45.9 |
| 2,518,164 | 8/1950 | Meyer ..................... 154/1 |
| 2,553,054 | 5/1951 | Lincoln et al. ............ 154/1.8 |
| 2,609,314 | 9/1952 | Engel et al. ............... 154/30 |
| 2,633,442 | 3/1953 | Caldwell ................. 154/106 |
| 2,668,327 | 2/1954 | Steele .................... 18/47.5 |
| 2,674,295 | 4/1954 | Steele et al. ............... 154/1 |
| 2,719,807 | 10/1955 | Steele ................... 154/117 |
| 3,006,798 | 10/1961 | Holland ................. 156/197 |
| 3,016,315 | 1/1962 | Robinson ............... 154/45.9 |
| 3,366,525 | 1/1968 | Jackson ................. 156/197 |
| 3,462,330 | 8/1969 | Greig et al. ............. 156/197 |
| 3,466,957 | 9/1969 | Anderson et al. ............ 83/23 |
| 3,598,676 | 8/1971 | Noble ................... 156/205 |
| 3,607,518 | 9/1971 | Ellinor .................. 156/197 |
| 3,700,649 | 10/1972 | Boram et al. ............. 428/116 |
| 3,810,800 | 5/1974 | Doll ...................... 156/78 |
| 3,819,439 | 6/1974 | Taylor .................... 156/89 |
| 3,899,626 | 8/1975 | Steffen .................. 428/474 |
| 3,993,630 | 11/1976 | Darmory et al. .......... 525/436 |
| 4,710,432 | 12/1987 | Nishimura et al. ....... 428/542.8 |

Primary Examiner—George F. Lesmes
Assistant Examiner—James D. Withers
Attorney, Agent, or Firm—Townsend and Townsend Khourie and Crew

[57] ABSTRACT

Honeycomb fabricated of non-crosslinked polymer is prepared by impregnating a fiber web with a linear prepolymer which is soluble in an organic solvent, and which is readily converted by thermal curing in the absence of a crosslinking agent to an insoluble form with a glass transition temperature exceeding 200° C., preferably exceeding 250° C. The preferred prepolymer is the product of diaminodiphenylsulfone and trimellitic anhydride, and forms a poly(amide-imide) upon cure. A process for forming the impregnated honeycomb is also disclosed, which involves impregnating ribbons or sheets, forming them into stacks bonded together at node lines, expanding the stacks into honeycomb structures, and heat soaking the expanded structures to cure the resin and stabilize the structure.

7 Claims, No Drawings

HONEYCOMB OF FABRIC-REINFORCED POLYIMIDE POLYMER

CROSS REFERENCE TO RELATED APPLICATION

This application is a continuation-in-part of copending application Ser. No. 07/404,240, filed Sep. 7, 1989, now abandoned.

This invention lies in the fields of honeycomb structures and polymer processing techniques. The particular area addressed by this invention is that relating to honeycomb structures formed of fabric-reinforced polymer.

BACKGROUND AND SUMMARY OF THE INVENTION

Honeycomb has long been known for use in structural elements where a combination of lightness and strength are desirable. The use of nonmetallic materials such as ceramics and plastics offers additional advantages in terms of processing characteristics and the appearance and properties of the final product.

Thermoset plastics have been used in the manufacture of honeycomb, including honeycomb formed by bonding together corrugated ribbons of the plastic as well as honeycomb formed by bonding together corrugated ribbons of fabric impregnated with thermosetting resin followed by curing the resin in the honeycomb. Honeycomb structures formed with thermoset plastics have certain disadvantages, however, and these include limitations on the manufacturing techniques and a low resistance to damage. Because of the low damage resistance, the product is highly susceptible to damage during fabrication and lay-up and to fragmentation upon handling.

The present invention provides plastic-based honeycomb which does not suffer these disadvantages, but instead has acceptable mechanical properties and the capability of being fabricated and handled by simpler and more versatile techniques. Honeycomb structures in accordance with this invention have the strength, impact resistance and processing characteristics of thermoplastic materials and yet offer high temperature resistance and solvent resistance characteristics which permit such processing steps as the application of multiple coatings for purposes of density adjustment and the formation of composite layers.

Central to the invention is the selection of a linear prepolymer which is soluble in a preselected solvent, and which, without crosslinking, is heat curable to a linear polymer which is insoluble in that solvent, the cured polymer having a glass transition temperature equal to or greater than about 200° C. A fiber web is initially impregnated with the prepolymer, using any of a variety of techniques, to bond the fibers of the web into a stable coherent structure. A laminated structure which is expandable into a honeycomb panel is then formed by arranging ribbons or sheets of the impregnated web into a stack, with adjacent ribbons or sheets bonded together along transverse node lines. The laminated structure is then expandable into an open-cell honeycomb structure, with the optional application of heat to facilitate the expansion. The expanded structure is then heated further to complete the cure and stabilize the structure. The cured resin has a thermoplastic character which permits expansion and handling without damage to the resin. The insolubility of the cured resin permits the resin to be applied in stages, with repeated applications subsequent to the expansion and initial cure if desired. In this manner, high resin loadings can be achieved, and layers of different resins or coating materials can be applied to form a composite structure with a specified combination of properties. In preferred embodiments, the initial impregnation is done by dipping the fiber web in a solution of the prepolymer.

Other advantages, features and embodiments of the invention will be apparent from the description which follows.

DETAILED DESCRIPTION OF THE INVENTION AND PREFERRED EMBODIMENTS

The present invention is applicable to honeycomb structures in general as well as to the various known methods of structural honeycomb manufacture. The invention is of particular interest however as applied to honeycomb formed from nested stacks of ribbons or sheets which are bonded together at node lines periodically spaced along each layer.

The resin serving as the fabric impregnant is a linear polymer or prepolymer which is susceptible to curing in the absence of a crosslinking agent to form a linear polymer with a glass transition temperature of about 200° C. or higher. Preferred resins are those which upon cure form a polymer with a glass transition temperature within the range of about 200° C. to about 350° C., more preferably from about 250° C. to about 300° C., and most preferably from about 265° C. to about 285° C. In its uncured form the resin is soluble in a solvent, whereas once cured the resin is insoluble in that solvent.

The terms "thermal curing," "thermal conversion" and related terms used herein are intended to denote a chemical reaction, such as condensation, chain lengthening, or other type of conversion which alters the molecular structure of the polymer or prepolymer, and which occurs spontaneously upon exposure to elevated temperature.

Preferred prepolymers are those which are precursors to (i.e., upon curing form) poly(amide-imide)s. Particularly preferred are those which upon curing have the following structure:

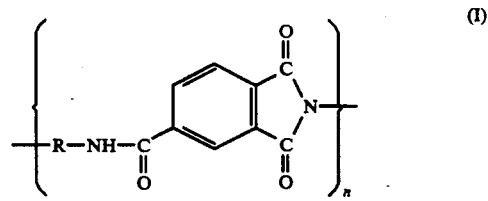

(I)

In Formula I, R is alkyl, preferably $C_1$-$C_6$, straight-chain or branched-chain; aryl, preferably phenyl, naphthyl, diphenylsulfide, diphenylsulfoxide or diphenylsulfone; or arylalkyl combinations such as benzyl and diphenylmethylene. The symbol n in Formula I is an integer representing the chain length of the resin, preferred values of n being those resulting in resins of the desired viscosity when in solution and other physical characteristics of the polymer.

Formula I represents the polymer in cured form, insoluble in any of a variety of solvents and not crosslinked. The prepolymer is any precursor of the above which is soluble in the same solvents. The precursor may be a partially polymerized analogue of the insoluble polymer or a fully polymerized analogue with different functional groups, such as a polyamide rather than a poly(amide-imide). Preferred precursors are those whose solubility is derived from free acid groups in place of the heterocyclic ring and present in a sufficient number to impart solubility. One possibility for the precursor is a polymer represented by the formula

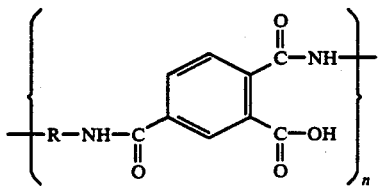

Particularly preferred polymers within the scope of Formula I are those represented by the formula

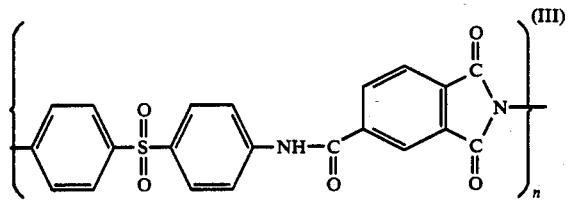

The acid precursor of this polymer is as follows:

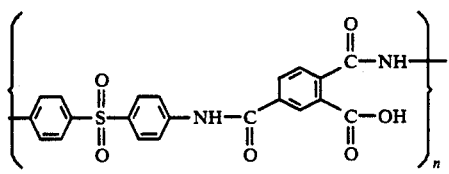

The precursor shown in Formula IV is formed by the reaction between diaminodiphenylsulfone and trimellitic anhydride. Preferred precursors within this formula as well as precursors in general within Formula II above are those having an acid number ranging from about 50 to about 100 when dissolved in a solvent as a 25% solution by weight. A prepolymer which has been found to be particularly effective is a product defined as AI-10 Polymer, supplied by Amoco Chemicals Corporation, Chicago, Ill., which undergoes thermal curing at temperatures of 350° F. (177° C.) and above. This material when in solution at a solids content of 30% by weight has a Brookfield viscosity of 25–40 poise at 25° C. and a density of 1.10 g/cm$^3$ at 23° C., both of which are an indication of the value of n in Formula IV and the acid number.

The choice of solvent is not critical and may vary widely, provided that it dissolves the resin prior to its conversion to the insoluble state. Polar organic solvents are preferred, and examples are dimethylformamide, dimethylacetamide, dimethyl sulfoxide, N-methylpyrrolidone and m-cresol. The properties of the solution may be modified by the use of a diluent, which may be any liquid which is miscible with the solvent, does not cause premature precipitation of the unconverted resin, and yet does not dissolve the converted polymer. Examples of diluents compatible with the solvents listed above are aromatic hydrocarbons, ethyl acetate, acetone, cyclohexanone, acetamide and acetanilide. The diluent may serve as an aid in removing the solvent, as for example by evaporation, or as an additive for adjusting the viscosity of the solution, or both.

The concentration of resin in the solution may also vary, and will be chosen in accordance with the desired viscosity of the solution and other processing characteristics. In most applications, best results will be obtained using solutions having a dissolved solids content (i.e., the resin) of about 10% to about 30% by weight, preferably from about 15% to about 25% by weight. One solution which has been found to be effective is a solution of the AI-10 polymer in a mixture of 40% acetone and 60% N-methylpyrrolidone, with a solids content of about 18% to 22% by weight.

The web or reinforcement may be any material capable of being impregnated or coated by a resin. Both woven and nonwoven fabrics may be used, including both natural and synthetic materials. Reinforcements made from glass fibers are particularly useful. The porosity and weight of the fabric may also vary widely. In most cases, fabrics having a weight ranging from about 0.3 to about 3.0 ounces per square yard (10 to 100 grams per square meter), preferably from about 0.5 to about 2.0 ounces per square yard (17 to 68 grams per square meter) will provide the best results. As for the honeycomb itself, the dimensions are not critical and the invention applies to a wide range of honeycomb configurations and sizes. The most typical cells are hexagonal in shape, with a width of about one-quarter inch (0.6 cm) or less.

Fabrication of the honeycomb may be done in accordance with known procedures. The term "honeycomb" is used herein to denote any open-cell grid structure, and particularly such open-cell structures which are formed from bonded sheet stacks which are expanded or drawn apart. Examples of such stacks and the honeycomb panels which they form upon expansion are found in Steele, R. C., et al., U.S. Pat. No. 2,674,295 (Apr. 6, 1954); Holland, K. M., U.S. Pat. No. 3,006,798 (Oct. 31, 1961); Anderson, D. C., et al., U.S. Pat. No. 3,466,957 (Sep. 16, 1969); Noble, R. G., et al., U.S. Pat. No. 3,598,676 (Aug. 10, 1971); and Taylor, R. S., U.S. Pat. No. 3,819,439 (Jun. 25, 1974). The disclosures of these patents are incorporated herein by reference.

The bonded stacks which are expanded into open-cell honeycomb structures may be of various thicknesses, lengths and widths. As addressed by the present invention, the stacks may be formed from components which range from long, narrow strips or ribbons, to relatively wide sheets. In practice, ribbon stacks are generally formed from sheet stacks by cutting with a band saw or similar equipment. Other methods of preparation are possible, however, and the present invention is not contemplated to be limited to any particular method or any particular configuration of the stack. For purposes of convenience, ribbons and sheets will be referred to herein generically as "layers."

As one example of a fabrication procedure, a roll of glass fiber fabric, typically 2 to 4 mils in thickness, is resin-impregnated by saturating the fabric with a solution of the resin in its soluble form. An example, as stated above, is the AI-10 polymer dissolved in a 40/60 mixture of acetone and N-methylpyrrolidone at a solids content of about 20% by weight. The saturated fabric is then passed through an oven at a temperature of about 400° F. (204° C.) for 5 to 8 minutes, which results in the acetone and N-methylpyrrolidone being flashed off and the remaining resin being dried and partially cured to a tack-free state. The roll is then cut into sheets. In one embodiment the roll is cut into sheets about 36 inches (91 cm) in width, on a 45° bias, i.e., in a direction such that the fibers are aligned at an angle of approximately 45° with respect to the lateral edges of the sheets. The longitudinal edges of the sheets are then overlapped, adhesively bonded together and heat sealed. This is followed by rolling the sheets into rolls and heat soaking the rolls at about 350° F. (177° C.) for at least one hour for final curing of the adhesive.

Once the rolls are cured, they are unrolled and node lines, typically of a high-temperature node-bond adhesive which is compatible with the resin and the fabric, are applied. Examples of such adhesives are nylon-modified epoxies and polyimide-based resin adhesives. These node lines are printed on the sheets at regular intervals using a standard gravure technique. The rolls are then cut into rectangular sheets which are stacked to a thickness of about 4 to 5 inches (10 to 13cm). The stacks are then placed in a press where they are heated to a temperature of about 350° F. (177° C.) under a pressure of about 25 to 200psi (1.76 to 14.1 kg/cm$^2$) to cure the node adhesive, thereby bonding the sheets together at the node lines. The result is a stack ready for expansion into a honeycomb structure.

The stack may be expanded to an open-cell panel of the desired dimensions, and held in the expanded state by a jig or frame. Stacks made from webs with a low resin content can be expanded at room temperature. In most applications, however, particularly those involving anything other than very low resin loadings, expansion is best done with the aid of heat, which is conveniently applied by the use of steam and/or hot water.

After expanding and framing, the honeycomb block may then be heat soaked, i.e., placed in an oven at an elevated temperature for further cure of the resin and stabilization of the structure. The optimum temperature will depend on the particular polymer being used, but will generally be at least about 400° F. (204° C.), preferably from about 400° F. to about 600° F. (204°-316° C.), more preferably from about 500° F. to about 600° F. (260°-316° C.) (particularly for resins of Formula II), and most preferably from about 500° F. to about 550° F. (260°-288° C.) (particularly for resins of Formula IV). The heating time will generally be at least about thirty minutes, and preferably from about thirty to about ninety minutes. For the AI-10 polymer referred to above, a heat soak at 550° F. (288° C.) for one hour has been used effectively.

Thus expanded, the honeycomb may be dipped in fresh resin solution to add further resin to the structure by forming a film over the cured surface of the honeycomb. The solvent is then removed from the film and the newly applied resin is cured and heat soaked in the same manner as the resin of the first application. The dipping procedure may be repeated as often as desired to achieve a final honeycomb of the desired density and other characteristics.

When successive applications of resin are made, the resins may be the same or different. When different resins are combined in either of these two ways in a single honeycomb structure, the resins must be compatible with each other. Two resins are considered compatible when they fuse together as one cures over a cured layer of the other, thereby forming layers which are not easily separated by physical or mechanical means. The combining of two or more resins in this fashion permits the formation of hybrid structures and the achievement of useful as well as synergistic properties.

The foregoing is offered primarily for purposes of illustration. It will be readily apparent to those skilled in the art that modifications and variations may be made in the materials, proportions, conditions and procedures used without departing from the spirit and scope of the invention.

What is claimed:

1. A laminated structure expandable into an open-cell grid structure, said laminated structure comprising layers of fabric bonded together at node lines periodically spaced along each said layer, each of said layers impregnated with a linear prepolymer in the substantial absence of a crosslinking agent, said linear prepolymer being one which is soluble in a selected solvent and convertible upon thermal curing to a linear polymer which is insoluble in said solvent and has a glass transition temperature equal to or greater than about 200° C., in which said linear prepolymer is one having the formula

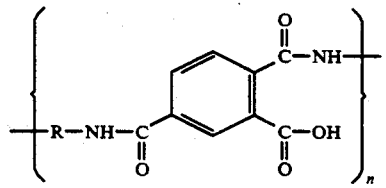

in which R is alkyl, aryl or combined alkyl and aryl, and n is an integer.

2. A laminated structure in accordance with claim 1 in which said linear prepolymer is one having an acid number ranging from about 50 to about 100.

3. A laminated structure in accordance with claim 1 in which said fabric is a glass fiber web.

4. A laminated structure in accordance with claim 1 in which said fabric is a glass fiber web having a weight of from about 0.3 to about 3.0 ounces per square yard.

5. A laminated structure in accordance with claim 1 in which said fabric is a glass fiber web having a weight of from about 0.5 to about 2.0 ounces per square yard.

6. A laminated structure expandable into an open-cell grid structure, said laminated structure comprising layers of fabric bonded together at node lines periodically spaced along each said layer, each of said layers impregnated with a linear prepolymer in the substantial absence of a crosslinking agent, said linear prepolymer being one which is soluble in a selected solvent and convertible upon thermal curing to a linear polymer which is insoluble in said solvent and has a glass transition temperature equal to or greater than about 200° C., in which said linear prepolymer is one having the formula

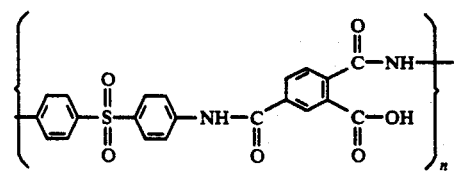

in which n is an integer.

7. A laminated structure in accordance with claim 6 in which said linear prepolymer is one having an acid number ranging from about 50 to about 100.

* * * * *